US011918838B2

(12) United States Patent
Hagge

(10) Patent No.: US 11,918,838 B2
(45) Date of Patent: Mar. 5, 2024

(54) FIRE SUPPRESSANT SYSTEM FOR AIRCRAFT CARGO CONTAINER

(71) Applicant: Kidde Technologies, Inc., Wilson, NC (US)

(72) Inventor: Harlan Hagge, Knightdale, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 505 days.

(21) Appl. No.: 16/596,011

(22) Filed: Oct. 8, 2019

(65) Prior Publication Data

US 2021/0101033 A1 Apr. 8, 2021

(51) Int. Cl.

*A62C 3/00* (2006.01)
*A62C 3/08* (2006.01)
*A62C 35/10* (2006.01)

(52) U.S. Cl.

CPC ................ *A62C 3/002* (2013.01); *A62C 3/08* (2013.01); *A62C 35/10* (2013.01)

(58) Field of Classification Search

CPC ........... A62C 35/10; A62C 3/002; A62C 3/08; A62C 35/08; A62C 13/62; A62C 13/64; A62C 13/00; A62C 13/003; A62C 37/12; F16K 17/403; F16K 17/16; F16K 17/18; F16K 17/383; F16K 17/40

USPC ........................ 169/62, 26–29; 277/304, 590

See application file for complete search history.

(56) References Cited

U.S. PATENT DOCUMENTS

| | | | | | |
|---|---|---|---|---|---|
| 3,756,321 | A * | 9/1973 | Gloeckler | A62C 37/09 169/40 |
| 3,907,037 | A | 9/1975 | Linsalato et al. | |
| 5,291,952 | A * | 3/1994 | Arend | A62C 35/023 169/84 |
| 7,456,750 | B2 | 11/2008 | Popp et al. | |
| 7,721,812 | B2 | 5/2010 | Reynolds | |
| 8,752,640 | B1 | 6/2014 | Pottlitzer et al. | |
| 2005/0252665 | A1* | 11/2005 | Kammer | A62C 37/12 169/42 |
| 2008/0087446 | A1* | 4/2008 | Sitabkhan | A62C 37/12 169/57 |

(Continued)

FOREIGN PATENT DOCUMENTS

| | | | |
|---|---|---|---|
| EP | 0138195 | A2 | 4/1985 |
| EP | 2937115 | A1 | 10/2015 |
| WO | 2019160290 | A1 | 8/2019 |

OTHER PUBLICATIONS

EP Search Report; Application No. 19212737.1-1113; dated Oct. 5, 2020; 15 pages.

(Continued)

*Primary Examiner* — Qingzhang Zhou
*Assistant Examiner* — Juan C Barrera
(74) *Attorney, Agent, or Firm* — CANTOR COLBURN LLP

(57) ABSTRACT

Disclosed is a fire suppressant system for a cargo container, the system having: a pressure vessel disposed within the cargo container, an exterior surface of the pressure vessel defining a fire suppressant-opening; a seal member that covers the fire suppressant-opening; and a connection feature connects the seal member to the pressure vessel, wherein the connection feature that releases the seal member when exposed to a predetermined minimum temperature.

11 Claims, 4 Drawing Sheets

(56) References Cited

U.S. PATENT DOCUMENTS

| | | | | |
|---|---|---|---|---|
| 2015/0306436 | A1* | 10/2015 | Chattaway | A62C 37/48 169/26 |
| 2016/0096051 | A1* | 4/2016 | Baker | A62C 37/36 169/46 |
| 2016/0263410 | A1 | 9/2016 | Enk, Sr. | |
| 2017/0120089 | A1* | 5/2017 | Fisher | A62C 35/10 |
| 2019/0111292 | A1* | 4/2019 | Rogers | A62C 3/08 |

OTHER PUBLICATIONS

Partial European Search Report; Application No. 19212737.1; dated Jun. 17, 2020; 65 pages.

* cited by examiner

FIRE SUPPRESSANT SYSTEM FOR AIRCRAFT CARGO CONTAINER

BACKGROUND

Exemplary embodiments pertain to the art of fire suppression systems and more specifically to a fire suppressant system for aircraft cargo container.

Cargo containers are utilized in transporting materials by aircraft. Such cargo containers may carry flammable material, may be unconnected to sources of electrical power, and may be carried in significant quantities aboard cargo-carrying aircraft. In such aircraft, the cargo containers may be loaded into a typically unoccupied cargo compartment. Quick suppression of a fire in any one of the cargo containers is advantageous. Typical fire suppression systems, however, may rely on total flooding of the cargo bay with a fire suppressant when a fire breaches the cargo container. Such delayed action by the suppression system may damage the aircraft and some or all cargo stowed throughout the cargo bay.

BRIEF DESCRIPTION

Disclosed is a fire suppressant system for a cargo container, the system comprising: a pressure vessel disposed within the cargo container, an exterior surface of the pressure vessel defining a fire suppressant-opening; a seal member that covers the fire suppressant-opening; and a connection feature connects the seal member to the pressure vessel, wherein the connection feature that releases the seal member when exposed to a predetermined minimum temperature.

In addition to one or more of the above disclosed aspects or as an alternate the connection feature is an eutectic solder.

In addition to one or more of the above disclosed aspects or as an alternate the predetermined minimum temperature is 300 degrees Fahrenheit.

In addition to one or more of the above disclosed aspects or as an alternate the pressure vessel is filled with a fire suppressant.

In addition to one or more of the above disclosed aspects or as an alternate the fire suppressant is compressed and is one of Halon, Novec 1230, CF3I, 2-BTP, HFC-227ea, HFC-125, and HFC-236fa.

In addition to one or more of the above disclosed aspects or as an alternate the fire suppressant-opening on the exterior surface of the pressure vessel has a first shape that is curved.

In addition to one or more of the above disclosed aspects or as an alternate the seal member has a perimeter with a second shape that matches the first shape of the fire suppressant-opening.

In addition to one or more of the above disclosed aspects or as an alternate the fire suppressant-opening on the exterior surface is circular.

In addition to one or more of the above disclosed aspects or as an alternate the exterior surface of the pressure vessel has a third shape that is spherical.

In addition to one or more of the above disclosed aspects or as an alternate a first diameter of the fire suppressant-opening is greater than twenty-five percent of a second diameter of the pressure vessel.

In addition to one or more of the above disclosed aspects or as an alternate the first diameter is greater than three inches and the second diameter is substantially twelve inches.

Further disclosed is a cargo container comprising a system having one or more of the above disclosed aspects.

In addition to one or more of the above disclosed aspects or as an alternate the cargo container includes a ceiling, and the pressure vessel is secured to the ceiling.

In addition to one or more of the above disclosed aspects or as an alternate the cargo container is a unit load device (ULD).

In addition to one or more of the above disclosed aspects or as an alternate a ratio of a first volume of the pressure vessel to a second volume of the cargo container is at least 1:1500.

In addition to one or more of the above disclosed aspects or as an alternate the first volume is at most 0.1 cubic feet and the second volume is at least 150 cubic feet.

Further disclosed is an aircraft comprising: a cargo bay; and a cargo container having one or more of the above disclosed aspects.

In addition to one or more of the above disclosed aspects or as an alternate the cargo container is a first cargo container of a plurality of cargo containers stowed in the cargo bay, and each of the plurality of cargo containers includes the fire suppressant system.

Further disclosed is a method of configuring a pressure vessel for suppressing fire in a cargo container stowed in a cargo bay of an aircraft, comprising: sealing a seal member to a pressure vessel with a connection feature so that the seal member covers a fire suppressant-opening on an external surface of the pressure vessel, wherein a first diameter of the fire suppressant-opening is greater than twenty-five percent of a second diameter of the pressure vessel, and wherein the connection feature is configured to dissolve at a predetermined minimum temperature.

In addition to one or more of the above disclosed aspects or as an alternate the method includes filling the pressure vessel with compressed fire suppressant before sealing the seal member to the pressure vessel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
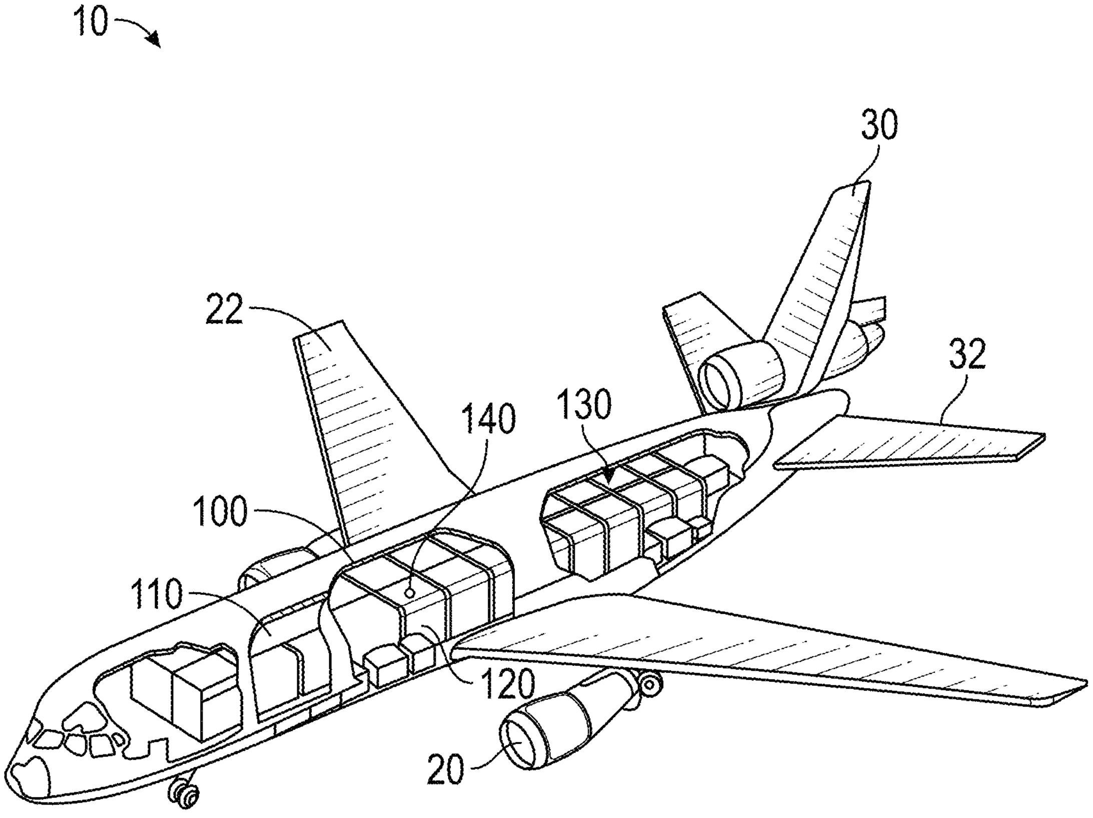
FIG. 1 is a perspective view of an aircraft including a fire suppression system according to an embodiment.

FIG. 1 illustrates an example of an aircraft 10. The aircraft 10 includes two wings 22, a horizontal stabilizer 32 and vertical stabilizer 30. The aircraft incudes aircraft engines on the two wings 22 or other locations surrounded by (or otherwise carried in) respective nacelles 20. In one embodiment the aircraft 10 is a commercial aircraft. The aircraft 10 includes a cargo bay 110 that, as illustrated, includes a plurality of cargo containers 130. The plurality of cargo containers 130 includes at least a first cargo container (cargo container) 120. The cargo container 120 may be a unit load device (ULD). A ULD is a pallet or container used to load luggage, freight, and mail on wide-body aircraft configured according to regulations published by the International Air Transport Association (IATA).

A fire suppressant system (system) 200 is installed in the cargo container 120 and configured to extinguish a fire within the cargo container 120. As will be disclosed in detail below, the system 200 enables quick suppression of a fire within the cargo container 120 before the fire breaches the cargo container 120, and without flooding the cargo bay 110.

Figure 2:
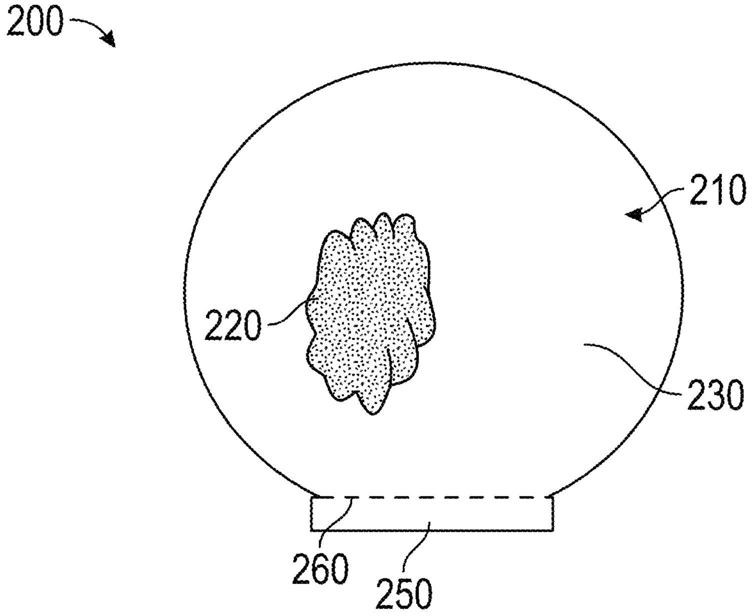
FIG. 2 is a side view of a pressure vessel of the fire suppression system of FIG. 1.
Figure 3:
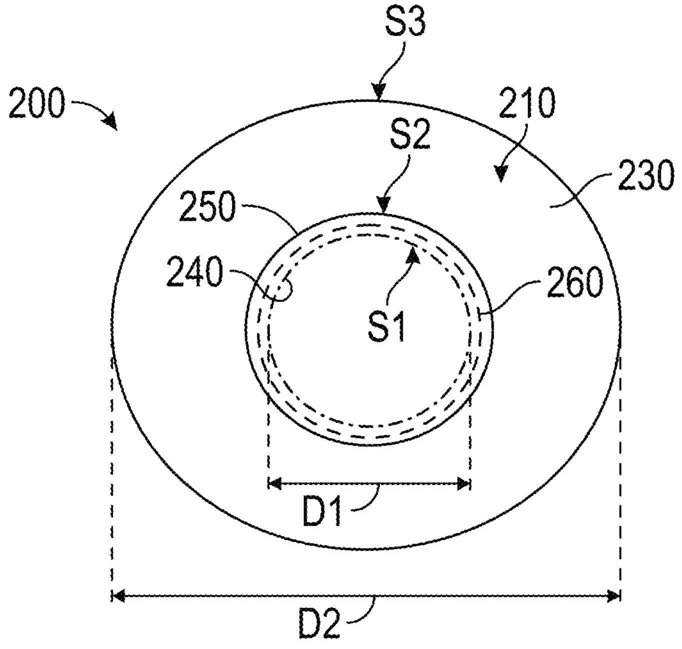
FIG. 3 is a bottom view of the pressure vessel.
Figure 4:
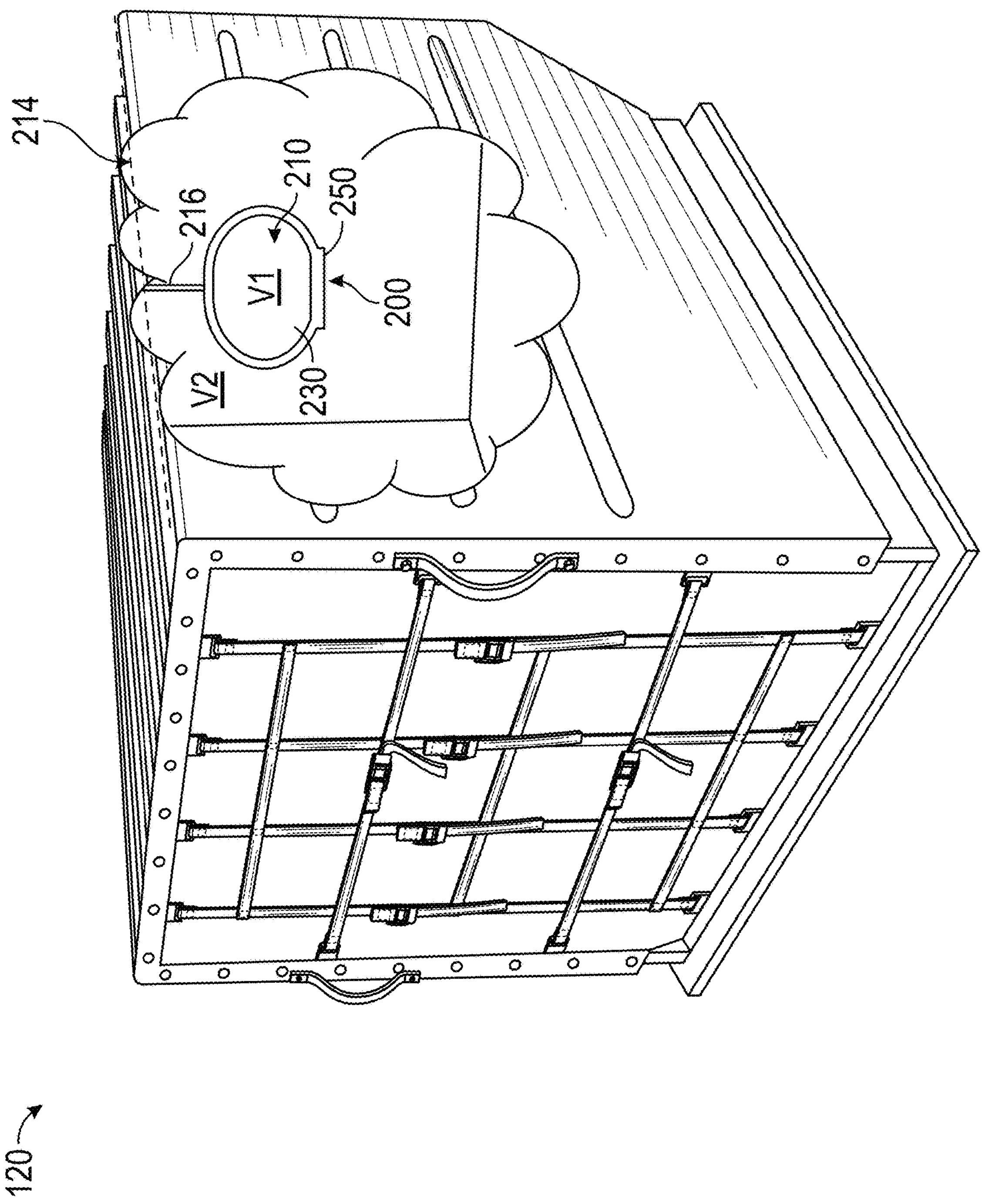
FIG. 4 shows a cargo container with the pressure vessel disposed therein.

Turning to FIGS. 2-4, the system 200 includes a pressure vessel 210 within the cargo container 120. The pressure vessel 210 may be connected to a ceiling 214 of the cargo container 120 (FIG. 4), supported for example by a rod 216 or other support structure. The pressure vessel 210 is filled with a pressurized gaseous fire suppressant (fire suppressant) 220 (FIG. 2). The fire suppressant 220 may be Halon, Novec 1230, CF3I, 2-BTP, HFC-227ea, HFC-125, or HFC-236fa. Such fire suppressant 220 may be other materials capable of providing an inerting agent concentration inside the cargo container 120 upon agent release.

An exterior surface 230 of the pressure vessel 210 defines a fire suppressant-opening 240 (FIG. 3, illustrated schematically). A seal member 250 is positioned against the exterior surface 230 of the pressure vessel 210 and covers the fire suppressant-opening 240.

A connection feature 260 (FIGS. 2-3, illustrated schematically) connects the seal member 250 to the pressure vessel 210. The connection feature 260 is configured to release the seal member when exposed to a predetermined minimum temperature, such as a temperature occurring during a fire.

According to an embodiments, the connection feature 260 is an eutectic solder (solder). The solder has a relatively low melting temperature. For example, the solder has a melting temperature of 300 degrees Fahrenheit. The connection feature 260 therefore functions as a valve for the pressure vessel 210.

Upon melting of the solder, the cover 250 is released allowing an inerting concentration of the fire suppressant 220 to be released from the pressure vessel 210 through the fire suppressant-opening 240 into the cargo container 120. Thus, the disclosed embodiments enable suppressing fires within the cargo container 120 stored in the 110 cargo bay of the aircraft 10. Of the plurality of cargo containers 130, only the cargo container 120 is subjected to any impact of the container fire.

The fire suppressant-opening 240 on the exterior surface 230 of the pressure vessel 210 may have a perimeter with a first shape S1 that is curved (FIG. 3). The seal member 250 may have a second shape S2 that matches the first shape S1 of the fire suppressant-opening 240 (FIG. 3). For example, and as illustrated in FIG. 3, both the fire suppressant-opening 240 and the seal member 250 may be circular. The seal member 250 may be larger than the fire suppressant-opening 240 for sealing purposes. The seal member 250 may be formed from a plate so that it is disk shaped. Other shapes of the pressure vessel 210, the fire suppressant-opening 240 and the seal member 250 are within the scope of the disclosure.

The pressure vessel 210 may have a third shape S3 that is spherical (FIG. 3). In one embodiment a first diameter D1 of the fire suppressant-opening 240 is about at least twenty-five percent_of a second diameter D2 of the pressure vessel 210. This enables rapid expulsion of fire suppressant 220 from within the pressure vessel 210. For example, the first diameter D1 of the fire suppressant-opening 240 is greater than three inches and the second diameter D2 of the pressure vessel 210 is substantially twelve inches. A ratio of a first volume V1 of the pressure vessel 210 to a second volume V2 of the cargo container 120 may be at least 1:1500 (FIG. 4). For example, the first volume V1 of the pressure vessel 210 may be at most 0.01 cubic feet and the second volume V2 of the cargo container 120 may be at least 150 cubic feet. This configuration enables storing enough of the fire suppressant 220 in the pressure vessel 210 to suppress a fire in the cargo container 120. The values mentioned in this paragraph are one embodiment. Depending upon the fire-fighting effectiveness of the agent being used, the values may differ from this one embodiment.

With the above disclosed embodiments, upon melting the solder forming the connection feature 260, the seal member 250 will become loose. The pressure of the fire suppressant 220 will decouple the seal member 250 from the pressure vessel 210, at least partially. This will release the fire suppressant 220 from the pressure vessel 210. The fire suppressant 220 will thus be discharged into the cargo container 120.

Figure 5:
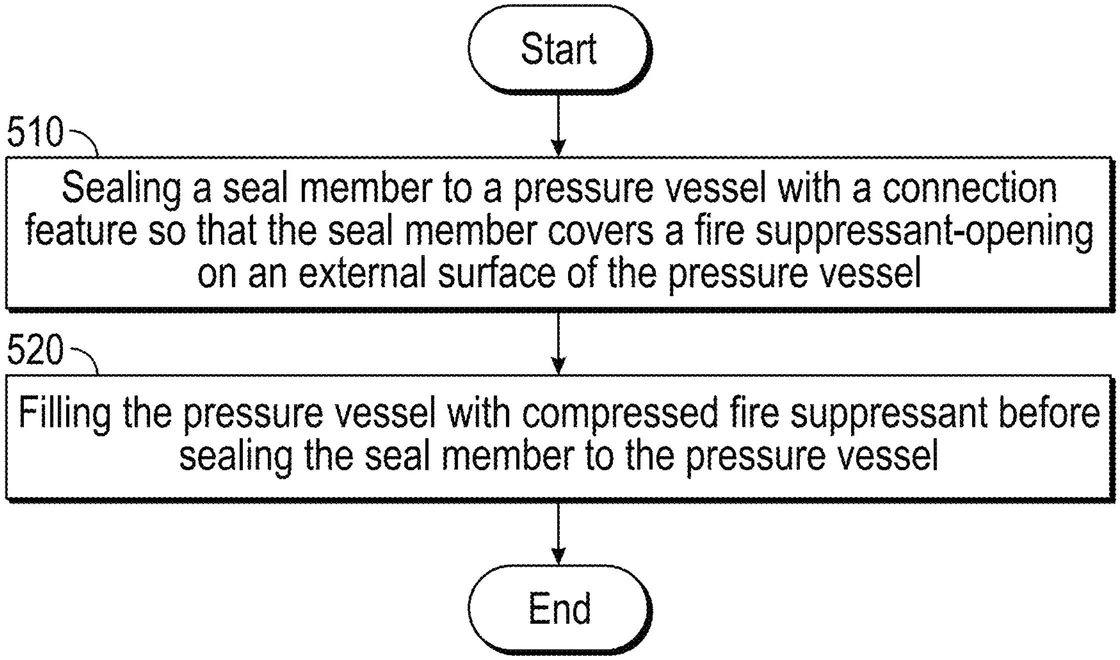
FIG. 5 is a flow chart showing a method of configuring a pressure vessel for suppressing fire in a cargo container stowed in a cargo bay of an aircraft.

Turning to FIG. 5, a flow chart shows a method of configuring a pressure vessel 210 for suppressing fire in a cargo container 120 stowed in a cargo bay 110 of an aircraft 10. As illustrated in block 510 the method includes sealing a seal member 250 to a pressure vessel 210 with a connection feature 260 so that the seal member 250 covers a fire suppressant-opening 240 on an external surface 230 of the pressure vessel 210. As indicated a first diameter D1 of the fire suppressant-opening 240 is greater than twenty-five percent of a second diameter D2 of the pressure vessel 210, and a ratio of a first volume V1 of the pressure vessel 210 to a second volume V2 of the cargo container 120 is at least 1:1500. In addition, as indicated, the connection feature 260 is configured to dissolve at a predetermined minimum temperature, for example 300 degrees Fahrenheit. As shown in block 520 the method includes filling the pressure vessel 210 with compressed fire suppressant before sealing the seal member to the pressure vessel 210.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cargo container comprising:

a fire suppressant system, comprising:

a pressure vessel, filled with a fire suppressant, disposed within the cargo container, the pressure vessel having exterior defined by an outer wall, the outer a-wall of the pressure vessel consisting of a single opening, the single opening is a fire suppressant-opening that acts as (i) a fill opening that fills the pressure vessel with fire suppressant prior to sealing the fire suppressant-opening and as (ii) a distribution opening that distributes from the pressure vessel the fire suppressant after sealing the fire suppressant-opening;

a seal member that covers the fire suppressant-opening; and a connection feature that is an eutectic solder and connects the seal member to the pressure vessel, wherein the connection feature that releases the seal member when exposed to a predetermined minimum temperature;

wherein:

the seal member is formed from a plate and is disk shaped;

the pressure vessel has a spherical exterior surface so that the spherical pressure vessel is a self-contained spherical container;

the fire suppressant-opening on the exterior surface is circular;

a first diameter defined by the circular fire suppressant-opening is greater than twenty-five percent of a second diameter defined by the spherical pressure vessel; and the disk shaped seal member is larger than the circular fire suppressant-opening for sealing purposes, wherein the seal member is positioned against the spherical exterior surface of the pressure vessel when covering the circular fire suppressant-opening.

2. The system of claim 1, wherein the predetermined minimum temperature is 300 degrees Fahrenheit.

3. The system of claim 1, wherein the fire suppressant is compressed and is one of Halon, Novec 1230, CF3I, 2-BTP, HFC-227ea, HFC-125, and HFC-236fa.

4. The system of claim 1, wherein the first diameter is greater than three inches and the second diameter is twelve inches.

5. The cargo container of claim 1, wherein the cargo container includes a ceiling, and the pressure vessel is secured to the ceiling.

6. The cargo container of claim 1, wherein the cargo container is a unit load device (ULD).

7. The cargo container of claim 1, wherein a ratio of a first volume of the pressure vessel to a second volume of the cargo container is at least 1:1500.

8. The cargo container of claim 7, wherein the first volume is at most 0.1 cubic feet and the second volume is at least 150 cubic feet.

9. An aircraft comprising:

a cargo bay; and the cargo container of claim 8.

10. The aircraft of claim 9, wherein the cargo container is a first cargo container of a plurality of cargo containers stowed in the cargo bay, and each of the plurality of cargo containers includes the fire suppressant system.

11. A method of configuring a pressure vessel for suppressing fire in a cargo container stowed in a cargo bay of an aircraft, the cargo container including a fire suppressant system that includes:

the pressure vessel disposed within the cargo container, the pressure vessel having exterior defined by an outer wall, the outer wall of the pressure vessel consisting of a single opening, the single opening is a fire suppressant-opening that acts as (i) a fill opening that fills the pressure vessel with fire suppressant prior to sealing the fire suppressant-opening and as (ii) a distribution opening that distributes from the pressure vessel the fire suppressant after sealing the fire suppressant-opening;

a seal member that covers the fire suppressant-opening; and a connection feature that is an eutectic solder and connects the seal member to the pressure vessel, wherein the connection feature that releases the seal member when exposed to a predetermined minimum temperature;

wherein: the seal member is formed from a plate and is disk shaped; the pressure vessel has a spherical exterior surface so that the spherical pressure vessel is a self-contained spherical container; the fire suppressant-opening on the exterior surface is circular; a first diameter defined by the circular fire suppressant-opening is greater than twenty-five percent of a second diameter defined by the spherical pressure vessel; and the disk shaped seal member is larger than the circular fire suppressant-opening for sealing purposes, wherein the seal member is positioned against the spherical exterior surface of the pressure vessel when covering the circular fire suppressant-opening;

the method comprising:

sealing the seal member to the pressure vessel with the connection feature so that the seal member covers the fire suppressant-opening on the external surface of the pressure vessel; and filling the pressure vessel with compressed fire suppressant before sealing the seal member to the pressure vessel.

* * * * *